Jan. 13, 1942. P. P. ANDERSON, JR Re. 22,001
REFRIGERATION
Original Filed Dec. 31, 1937
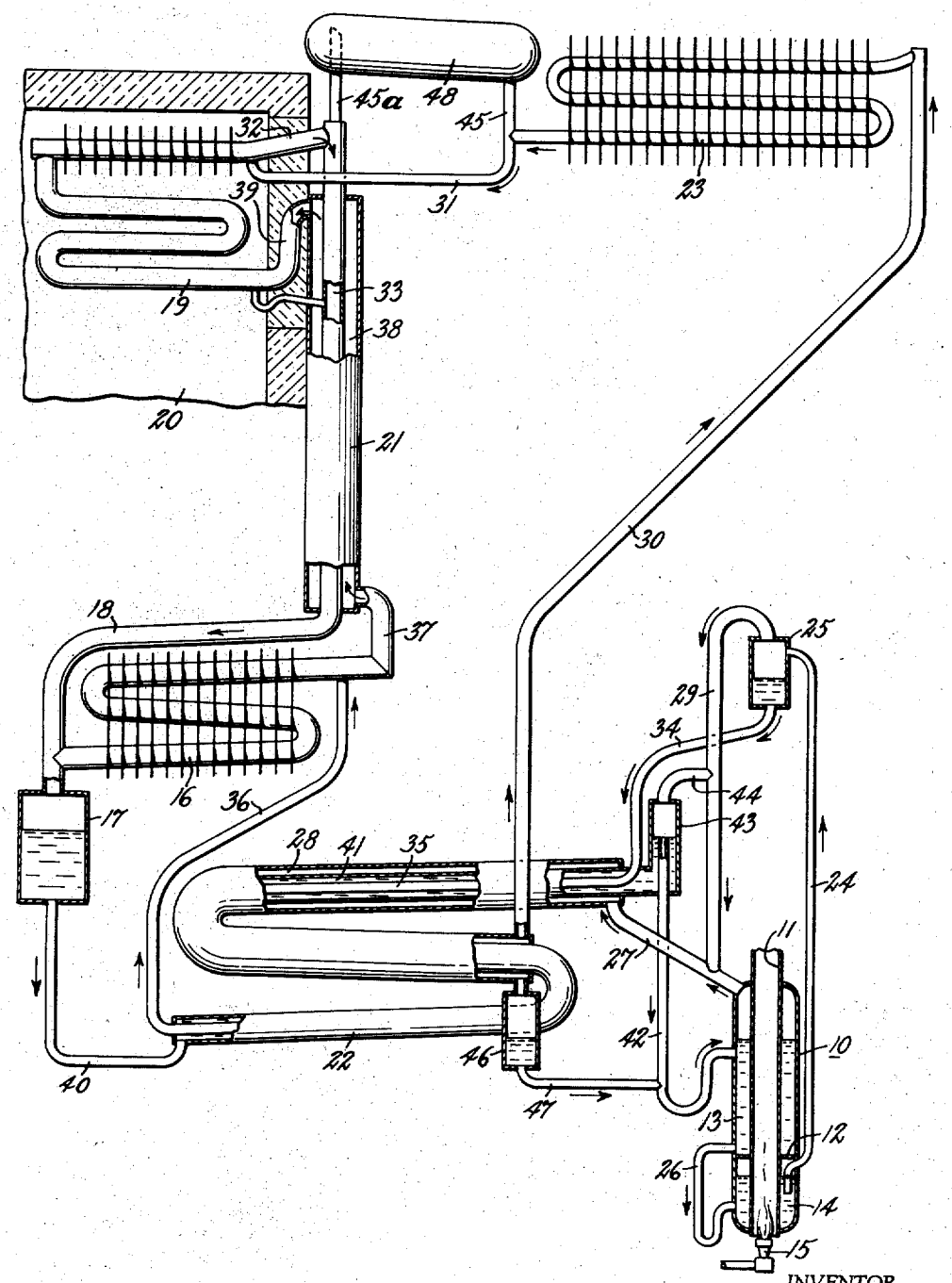
INVENTOR.
Philip P. Anderson Jr.
BY D. E. Heath
his ATTORNEY.

Reissued Jan. 13, 1942

Re. 22,001

UNITED STATES PATENT OFFICE 22,001

REFRIGERATION

Philip P. Anderson, Jr., Evansville, Ind., assignor to Servel, Inc., New York, N. Y., a corporation of Delaware Original No. 2,203,074, dated June 4, 1940, Serial No. 182,707, December 31, 1937. Application for reissue October 4, 1941, Serial No. 413,706

4 Claims. (Cl. 62—119.5)

My invention relates to an absorption type refrigeration system and it is an object of the invention to provide a system of this type having greater efficiency.

The single figure of the drawing shows more or less diagrammatically an absorption refrigeration system making use of an auxiliary pressure equalizing fluid and embodying the invention.

A generator 10 comprises an upright vessel through which extends a flue 11. The generator is divided by a partition 12 into an upper chamber 13 and lower chamber 14. The generator is heated by a gas burner 15 arranged so that the flame is projected into the lower end of the flue 11. Any other suitable heating means may be provided as, for instance, an electric heating element or a liquid fuel burner.

An absorber comprises a finned conduit 16 and a vessel 17. The lower end of conduit 16 is connected by conduit 18 to the upper part of vessel 17. An evaporator 19 comprises a coil located in an insulated refrigerator storage compartment 20. The evaporator and absorber are interconnected by members including a gas heat exchanger 21 as hereinafter described. The generator and absorber are interconnected by members including a triple heat exchanger 22. The generator is connected to an air cooled condenser 23 by members also including heat exchanger 22, and the condenser is connected to the evaporator 19.

The system contains a refrigerant fluid such as ammonia, a liquid absorbent for the refrigerant such as water, and an auxiliary pressure equalizing fluid such as hydrogen. The fluids may be introduced into the system through a charging plug, not shown, in the absorber vessel 17. A water solution of ammonia having a concentration of about 30% by weight, is inserted until the liquid level rises to the level of the charging plug. Hydrogen is then introduced at a pressure such that the total pressure in the system will be the condensing pressure of ammonia at a fairly high room temperature.

In operation, refrigerant vapor is expelled from solution by heating in the generator 10. Vapors are produced in both chambers 13 and 14. Vapors formed in chamber 14 depress the liquid in this chamber and rise through conduit 24 to a separating or circulation vessel 25, causing flow of liquid by vapor liquid lift action from chamber 14 through conduit 24 into vessel 25. Liquid is conducted from chamber 13 to chamber 14 through a conduit 26 which connects the lower part of chamber 13 to the lower part of chamber 14.

Vapors formed in chamber 13 flow from the upper part of this chamber through a conduit 27 to one end of the outside passage 28 of the triple heat exchanger 22. Vapors from circulation vessel 25 flow through a conduit 29 and conduit 27 into the outside heat exchanger passage 28. From the lower end of the heat exchanger passage 28, ammonia vapor flows through a conduit 30 to the upper end of the condenser 23. Ammonia vapor is condensed to liquid in the condenser 23 and the liquid ammonia flows through a conduit 31 into the upper end of the evaporator 19.

Liquid ammonia flows downward in evaporator 19 and evaporates and diffuses into hydrogen producing a refrigerating effect. The mixture of hydrogen gas and ammonia vapor, referred to as strong or rich gas, flows from the upper end of evaporator 19 through a conduit 32, the inner passage 33 of gas heat exchanger 21 and conduit 18 to the lower end of the absorber 16.

Weakened absorption liquid, referred to as weak solution, flows from the circulation vessel 25 through a conduit 34, the inner passage 35 of the heat exchanger 22, and a conduit 36 to the upper end of absorber 16. Weak solution flows downward in absorber 16 and absorbs ammonia vapor out of the gas. Weak or poor gas flows from the upper end of absorber 16 through conduit 37, the outer passage 38 of gas heat exchanger 21, and conduit 39 back to the lower end of evaporator 19.

Enriched absorption liquid, referred to as rich or strong solution, flows from the lower end of absorber 16 into the absorber vessel 17. Strong solution flows from vessel 17 through a conduit 40, the middle passage 41 of the heat exchanger 22, and conduit 42 into the upper chamber 13 of the generator.

The lower end of condenser 23 is connected by a conduit 45, a vessel 48, and a conduit 45a to conduit 18 in the gas circuit. This path of flow may be referred to as a vent, and vessel 48 provides a storage chamber for auxiliary fluid which is displaced into the gas circuit under high room temperature conditions in a known manner.

The described circulation of gas through and between the evaporator and absorber occurs automatically due to difference in weights of the columns of rich and weak gas as described in Patent 1,609,334 to von Platen and Munters. Flow of weak solution from the generator 10 to the absorber 16 takes place by vapor liquid lift through conduit 24 and gravity flow from vessel 25 in the previously described path. Flow of strong solution takes place by gravity from the absorber vessel 17 in the described path of flow to the generator 10. The upper end of the middle heat exchanger passage 41 is connected to the lower part of a vessel 43 and the upper end of conduit 42 extends upward into the upper part of vessel 43. The upper part of vessel 43 is connected by a conduit 44 to the vapor conduit 29 for equalization of pressure in vessel 43 and chamber 13 of the generator. The level of strong solution rises in absorber vessel 17 and vessel 43 until it reaches the upper end of conduit 42 whereupon liquid overflows into conduit 42 and flows as described into the generator.

The triple heat exchanger 22 is located below the surface levels of liquid in the absorber vessel 17 and vessel 43, and also below the surface level in circulation vessel 25 as determined by the point of overflow from the upper end of conduit 36 into the upper end of absorber 16.

In the triple heat exchanger 22, heat is transferred from weak solution flowing through inner passage 35 to cooler rich solution flowing through middle passage 41. Heat is also transferred from vapors flowing in outside passage 28 to the cooler rich solution flowing in middle passage 41. Both the weak solution and vapors flow in countercurrent relation through the heat exchanger to the strong solution. Thus, heat from the generator 10 which has been added to the weak solution and vapors is transferred in the triple heat exchanger 22 to the strong solution and thereby returned to the generator.

Cooling of vapors in the outside heat exchanger passage 28 is accompanied by condensation, the heat of condensation being transferred to the strong solution. This condensation effects removal of water vapor, this being referred to as rectification. The condensate formed in the outside passage 28 of the heat exchanger drains into a vessel 46 and thence through a conduit 47 and conduit 42 back to the generator 10. The levels of liquid are substantially the same in vessel 46, conduit 42, and chamber 13 of the generator 10. This liquid level provides the reaction head or liquid colum for balancing the fluid column in the vapor lift conduit 24. The vessel 46 provides an enlarged chamber which acts to produce stability of level in chamber 13 of the generator.

Various changes and modifications may be made within the scope of the invention which is not limited except as indicated in the following claims.

What is claimed is:

1. An absorption refrigeration system including a generator having a plurality of compartments one above the other and a heating flue extending upward through said compartments, an absorber, conduits for circulation of absorption liquid through and between said generator and absorber including a liquid heat exchanger and a vapor liquid lift conduit connected to the lowest of said generator compartments to cause said circulation of absorption liquid, a rectifier for vapor from said generator, arranged in direct heat transfer relation with said liquid heat exchanger, and a conduit for conducting liquid condensate by gravity from said rectifier to said generator.

2. An absorption refrigeration system including a condenser, an evaporator, an absorber, a generator including a heated chamber, a rising conduit having its lower end projecting into said heated chamber and forming a vapor lift by which vapor formed by heating of liquid in said chamber raises liquid to a level from which it flows by gravity to said absorber and thence back to said generator, a first conduit for conducting said raised liquid to said absorber, a second conduit for conducting the liquid flowing from said absorber to said generator, a conduit for conducting vapor from said generator to said condenser, parts of said three conduits being in coextensive heat exchange relation at a level below a surface level of liquid flowing from said absorber to said generator, said part of said conduit for vapor forming a rectifier, and a connection for draining condensate from said rectifier by gravity flow.

3. An absorption refrigeration system including a generator, a vapor liquefier, an evaporator, an absorber, a circuit for absorption liquid including said absorber and said generator, said generator including a heated chamber, and said absorption liquid circuit also including a rising conduit having its lower end extending into said heated chamber and forming a vapor lift by which vapor formed by heating of liquid in said chamber raises liquid to a level from which it flows through the remainder of said circuit by gravity, a part of said circuit through which liquid flows toward said absorber being in heat transfer relation with another part of said circuit in which liquid flows toward said generator, a conduit for vapor from said generator to said liquefier having a part forming a rectifier and located in heat transfer relation with said heat transfer part of said absorption liquid circuit in which liquid flows toward said generator, and a connection for conducting condensate by gravity flow from said rectifier into said liquid circuit.

4. An absorption refrigeration system including a plurality of places of heating, a place of absorption, a vapor liquid lift for raising liquid from one of said places of heating, a first conduit for conducting raised liquid to said place of absorption, a second conduit for conducting enriched liquid from said place of absorption to another of said places of heating, said first and second conduits having parts in heat exchange relation, a third conduit for conducting liquid from said second place of heating to said first place of heating, a rectifier for vapor from said places of heating arranged in direct heat transfer relation to said heat exchange part of said second conduit, and a further conduit for conducting liquid condensate by gravity from said rectifier to said second place of heating.

PHILIP P. ANDERSON, Jr.